(12) United States Patent
Elliot

(10) Patent No.: US 11,673,777 B2
(45) Date of Patent: Jun. 13, 2023

(54) SYSTEMS FOR A BRAKING ASSEMBLY IN A MOTOR HOUSING

(71) Applicant: Forcome Co. Ltd, Shanghai (CN)

(72) Inventor: Ronald L. Elliot, Oregon City, OR (US)

(73) Assignee: Forcome Co. Ltd, Shanghai (CN)

( * ) Notice: Subject to any disclaimer, the term of this patent is extended or adjusted under 35 U.S.C. 154(b) by 269 days.

(21) Appl. No.: 16/998,673

(22) Filed: Aug. 20, 2020

(65) Prior Publication Data
US 2022/0055875 A1 Feb. 24, 2022

(51) Int. Cl.
| | |
|---|---|
| *B66D 5/14* | (2006.01) |
| *F16D 65/58* | (2006.01) |
| *F16D 65/18* | (2006.01) |
| *H02K 7/102* | (2006.01) |
| *F16D 55/38* | (2006.01) |
| *B66D 5/24* | (2006.01) |
| *B66D 1/12* | (2006.01) |
| *F16D 121/14* | (2012.01) |
| *F16D 125/36* | (2012.01) |
| *F16D 65/12* | (2006.01) |
| *F16D 65/02* | (2006.01) |

(52) U.S. Cl.
CPC ............... *B66D 5/14* (2013.01); *B66D 1/12* (2013.01); *B66D 5/24* (2013.01); *F16D 55/38* (2013.01); *F16D 65/186* (2013.01); *F16D 65/58* (2013.01); *H02K 7/102* (2013.01); *F16D 65/128* (2013.01); *F16D 2065/1328* (2013.01); *F16D 2121/14* (2013.01); *F16D 2125/36* (2013.01)

(58) Field of Classification Search
CPC ........ F16D 55/025; F16D 55/38; F16D 55/39; F16D 55/46; F16D 65/22; F16D 65/38; F16D 65/52; F16D 65/58; F16D 65/60; F16D 2055/0033; F16D 2065/383; F16D 2121/14; F16D 2121/16; F16D 2121/36; B66D 5/14; B66D 1/14; H02K 7/102
See application file for complete search history.

(56) References Cited

U.S. PATENT DOCUMENTS

| | | | | |
|---|---|---|---|---|
| 2,670,086 | A * | 2/1954 | Eisberg | B66C 23/36 |
| | | | | 212/252 |
| 3,870,129 | A * | 3/1975 | Arnold | F16D 65/52 |
| | | | | 188/134 |
| 6,138,801 | A * | 10/2000 | Shirai | F16D 65/22 |
| | | | | 188/162 |
| 7,222,700 | B2 | 5/2007 | Elliott | |
| 2019/0002254 | A1 | 1/2019 | Dennis et al. | |
| 2021/0395055 | A1* | 12/2021 | Elliott | F16D 55/38 |
| 2022/0055875 | A1* | 2/2022 | Elliot | F16D 65/186 |

* cited by examiner

*Primary Examiner* — Thomas J Williams
(74) *Attorney, Agent, or Firm* — McCoy Russell LLP

(57) ABSTRACT

A braking system for a motor housing is provided. In one example, braking system comprises a double disk brake configuration arranged in a motor housing. A working position of the double disk brake is configured to automatically adjust based on a condition of a friction pad of a friction disk.

18 Claims, 4 Drawing Sheets

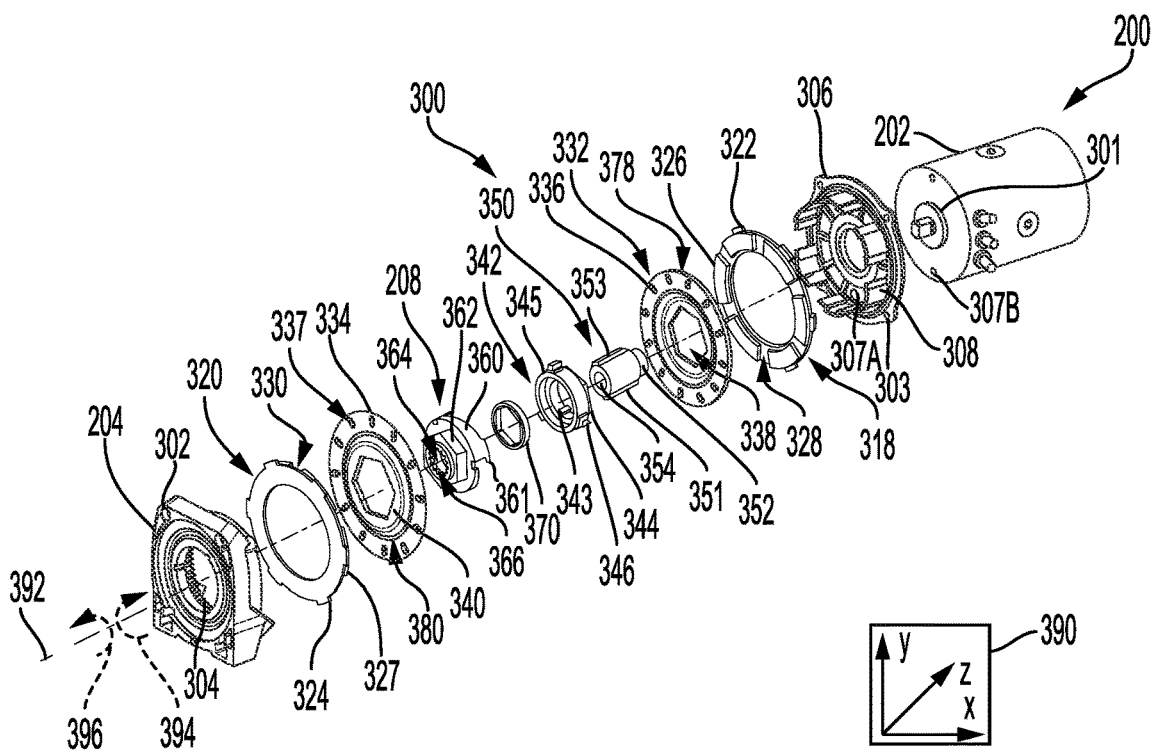
FIG. 3
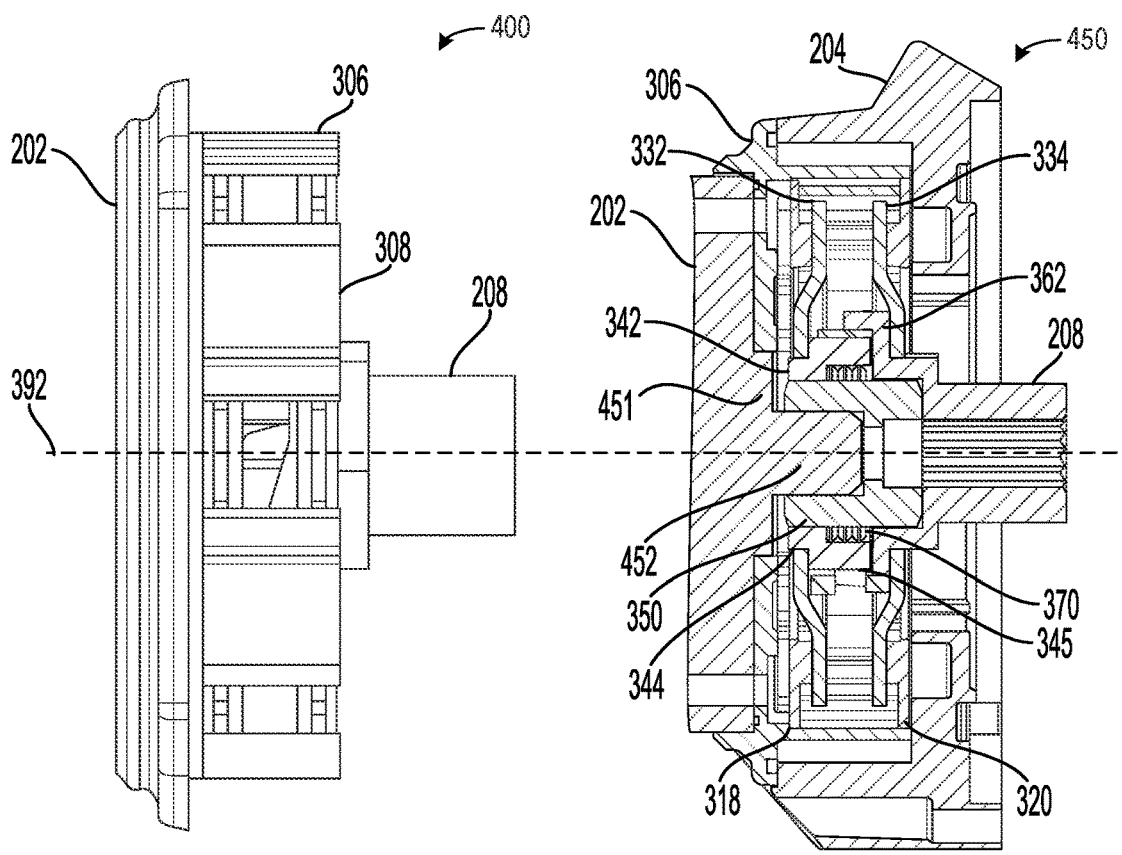
FIG. 4A
FIG. 4B

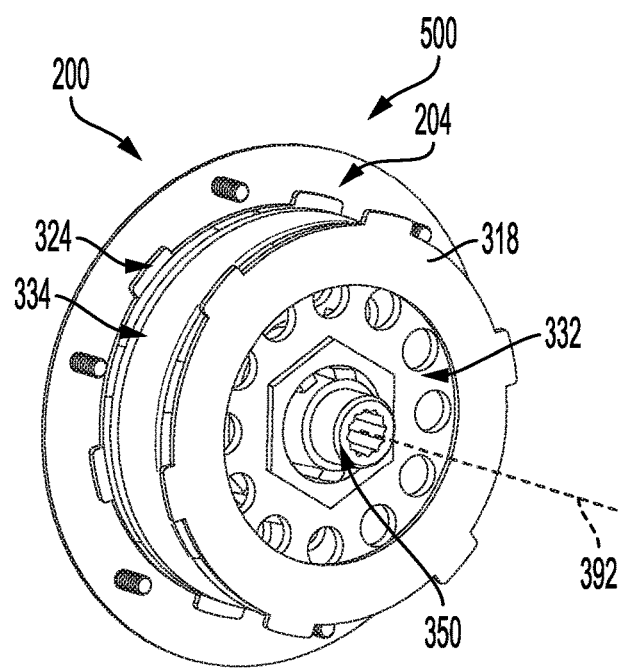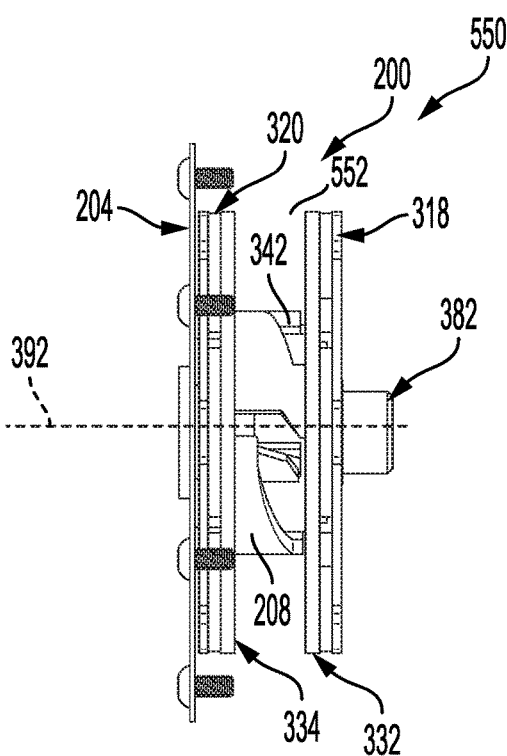
FIG. 5A  FIG. 5B
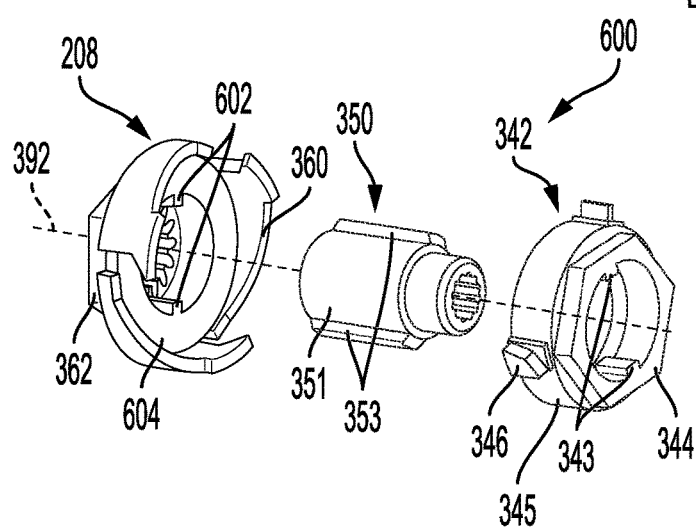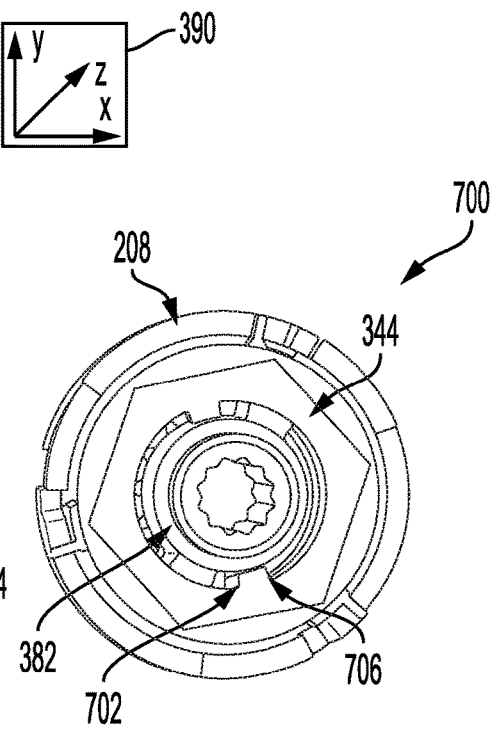
FIG. 6  FIG. 7

SYSTEMS FOR A BRAKING ASSEMBLY IN A MOTOR HOUSING

FIELD

The following disclosure is related to a motor housing or a drum support housing with an integrated double disk brake arranged therein.

BACKGROUND/SUMMARY

Mechanisms such as winches and hoists are used to wind and unwind ropes with loads coupled hereto. Brake systems have been employed in these mechanisms (e.g., winches, hoists, etc.) to modulate rope winding and/or unwinding speeds. Some brake systems, for example, may be specifically designed to reduce the chance of (e.g., substantially inhibit) reverse slipping.

Certain brakes systems utilizing radial brake engagement have previously been incorporated into drums. The inventor has recognized several drawbacks with radially engaging brake devices, such as relatively limited brake performance adjustability and complex servicing procedures. The inventor has also recognized that in mechanisms with braking devices integrated into the drum, heat generated by the braking device is transferred to the rope through the drum. Thermal degradation of the rope may be a result of the aforementioned heat flow. Ropes constructed out of synthetic materials are particularly susceptible to thermal degradation caused by the heat transferred from the brake system.

The inventor has recognized the brake performance adjustability issues related to radial engaging brake devices as well as the heat management issues arising from the integration of the brake system into the drum and developed a disk brake system in a motor housing or a drum support housing to at least partially resolve the heat management issues. In one example, the brake system comprises a disk brake, a friction disk, an input coupler, a cam follower, and an output coupler, wherein the brake system is arranged in a motor housing. A working position between a ramp surface of a stop feature and a surface of a cam follower protrusion is adjusted as pads of the friction disk reduce in size. In this way, performance of the braking system may be enhanced.

It should be understood that the summary above is provided to introduce in simplified form a selection of concepts that are further described in the detailed description. It is not meant to identify key or essential features of the disclosed subject matter. Furthermore, the disclosed subject matter is not limited to implementations that solve any disadvantages noted above or in any part of this disclosure.

BRIEF DESCRIPTION OF THE DRAWINGS

FIG. 3 shows an exploded view of the double disk brake system.
FIGS. 4A and 4B show views of the brake system assembled in a motor housing.
FIG. 5A shows the brake system without a housing.
FIG. 5B shows a side-on view of the brake system without the housing.
FIG. 6 shows a disassembled view of an output coupler, an input coupler, and a cam follower.
FIG. 7 shows an assembled view of the output coupler, the input coupler, and the cam follower.
FIGS. 1-9C are drawn approximately to scale. However, other relative dimensions of the components may be used, in other embodiments.

DETAILED DESCRIPTION

Figure 1:
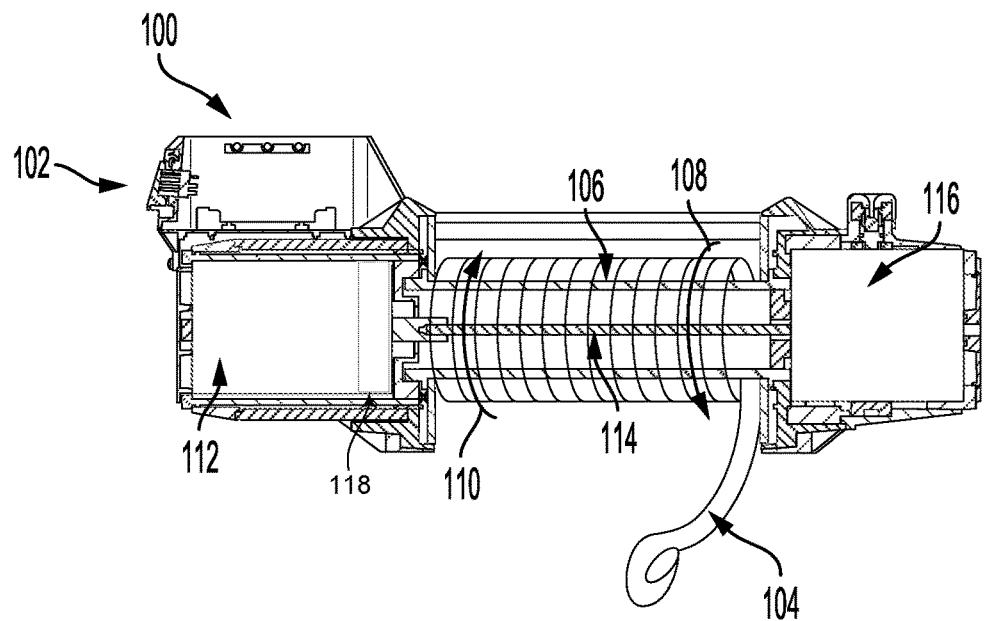
FIG. 1 shows a cross-sectional view of a winch.
Figure 2:
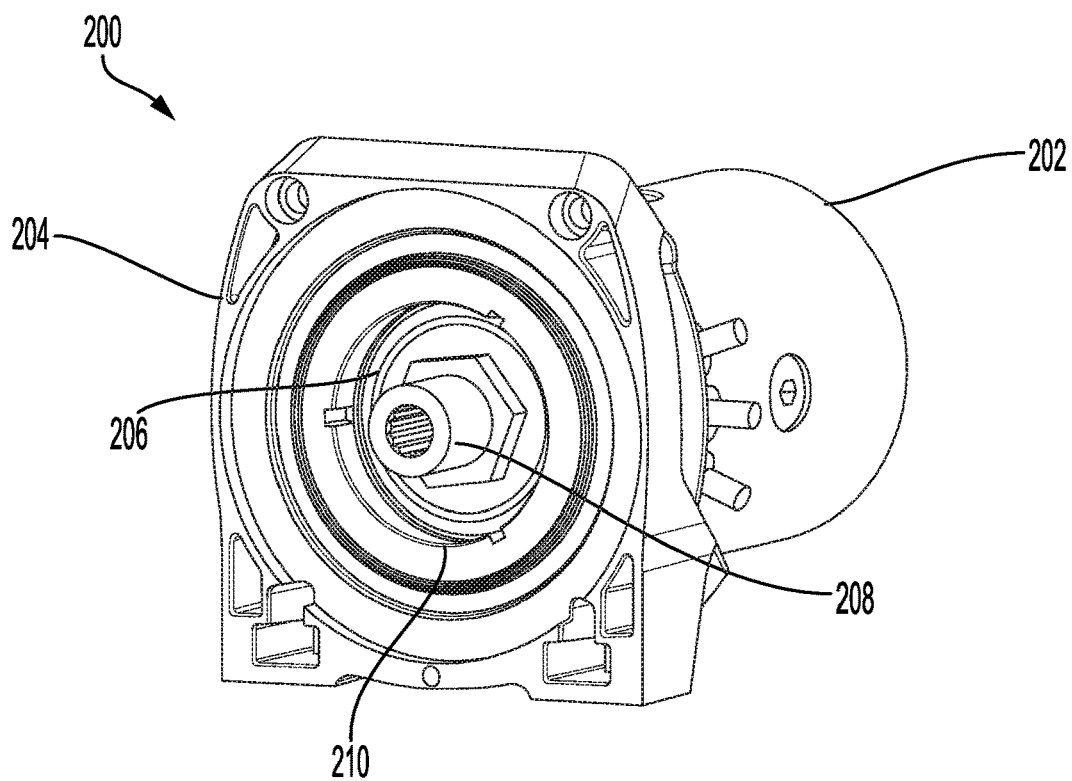
FIG. 2 shows an assembled double disk brake system.
Figure 8A:
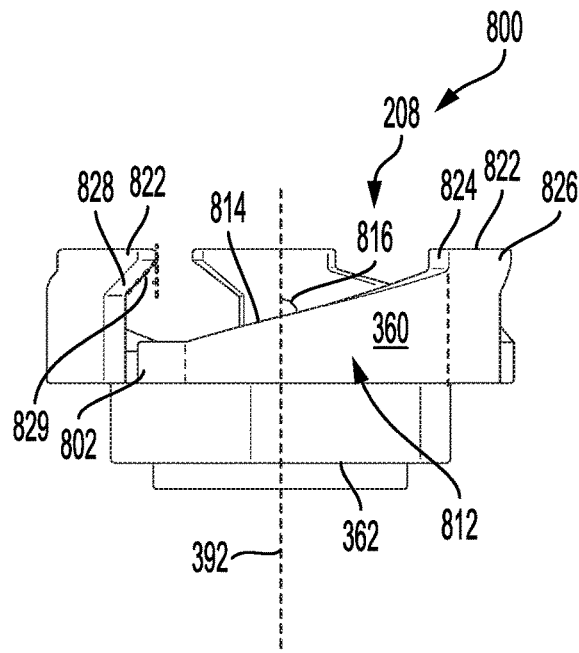
FIG. 8A shows the output coupler.
Figure 8B:
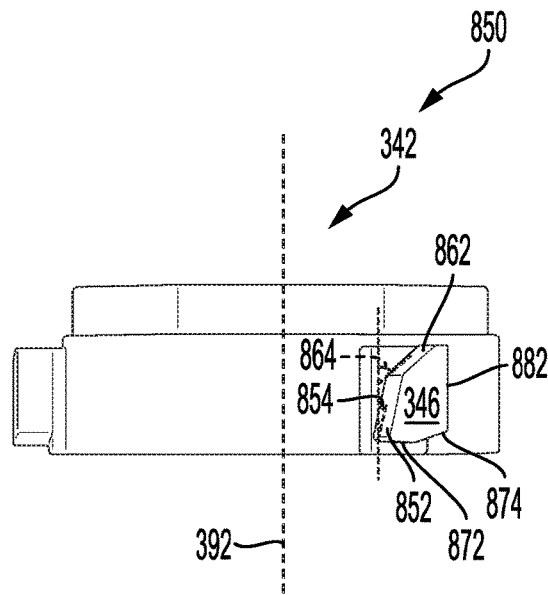
FIG. 8B shows the cam follower.
Figure 9B:
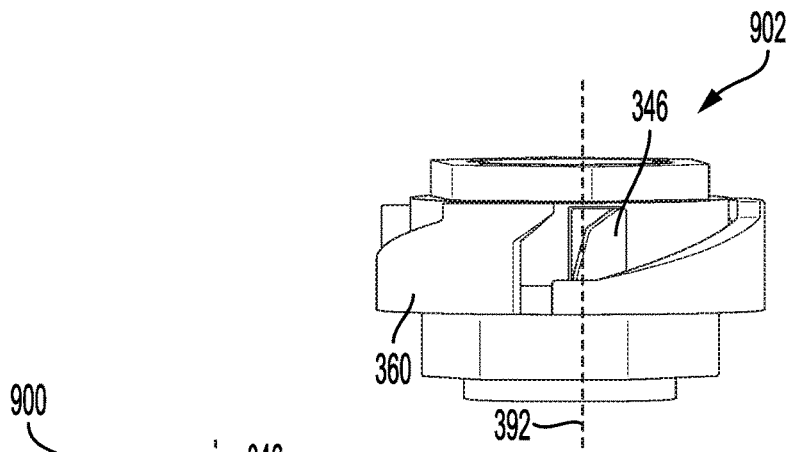
FIGS. 9B and 9C illustrate a progression of the working position as the brake pads wear.
Figure 9A:
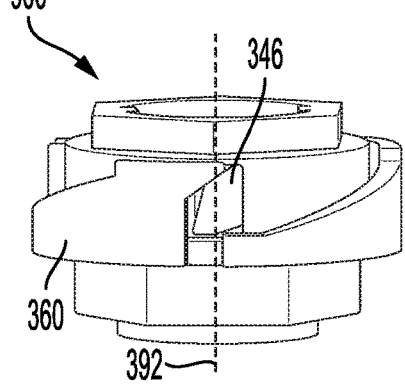
FIG. 9A shows a position of the output coupler and cam follower during a braking in a power-in or power-out condition.
Figure 9C:
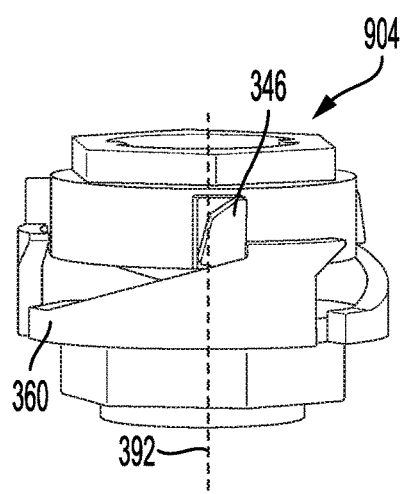

The following description relates to a double disk brake system integrated in a motor housing or as an extension of the motor housing, a motor support, or a drum support, for use with winches, hoists, or other types of gear boxes needing to stop or control unintended gear rotation. FIG. 1 illustrates a cross-sectional view of a winch. FIG. 2 illustrates an assembled double disk brake system in a motor housing. FIG. 3 shows an exploded view detailing each component of the double disk brake system from FIG. 2 contained in the motor housing. FIG. 4 displays a cross-sectional view of the double disk brake system fully assembled in the motor housing. FIG. 5 specifically illustrates the double disk brake system without the motor housing from two angles. FIG. 6 shows an exploded view of the cam system which includes the output coupler, input coupler, and cam follower. FIG. 7 presents a back facing view of the cam system when assembled. FIGS. 8A and 8B show the output coupler and cam follower disassembled to further detail the ramp system, respectively. FIGS. 9A, 9B, and 9C show a progression of a working position over a lifespan of a brake pad.

FIG. 1 shows a winch 100 including a rope 104 wound around a drum 106. The winch 100 further includes a motor 112 (e.g., electric motor, hydraulic motor, etc.) and a gear assembly 116, configured to transfer torque to the drum 106 from the motor 112 to wind and unwind the rope 104 during winch operation. To elaborate, the motor 112 transfers torque through a drive shaft 114 to a gear assembly 116. The drive shaft 114 extends from the motor 112 through the interior of the drum 106 and into the gear assembly 116, in the illustrated example. However, other drive shaft arrangements have been envisioned such as winch configurations where the motor is offset from the gear assembly and the drive shaft includes multiple sections rotationally coupled via belts, chains, etc. The gear assembly 116 includes a gear train (e.g., planetary gear train, non- planetary gear train (e.g., spur gear arrangement, worm gear arrangement, etc.), combinations thereof, etc.). Using a planetary gear arrangement has the benefit of providing a compact gear reduction that will fit in limited spaces available in many vehicles. The gear train is designed with a desired gear ratio to multiply the torque produced by the motor and transmitted to the drum at the expense of the drum's rotational speed. A free-spool clutch designed to selectively disconnect the drum 106 from the gear assembly 116, may also be included in the winch 100, in some instances.

The winch 100 also includes a brake system 118. The brake system 118 may be integrated into the motor housing 112. In the example of FIG. 1, the brake system 118 is integrated into the motor housing 112. At any rate, the braking system 118 may be integrated into a housing of the winch 100 on at a first extreme end of the drive shaft 114 opposite a second extreme end, wherein the gear assembly 116. In certain embodiments, the brake system may include a camming device configured to produce resistance to a load applied to a winch rope. This brake system may comprise components configured to release/reduce brake friction to control the rotation of gears of the gear housing 116. As a result, the chance of thermal energy, generated by the braking system, causing thermal degradation to components, such as the rope 104 on the drum 106, is reduced. Different examples of the friction brake system and specifically the camming devices in the brake system is discussed in greater detail herein with regard to FIGS. 2-9C.

The integration of the brake system 118 into the motor housing 112 enables portions of the motor housing 112 to function as a heat sink dissipating thermal energy generated during braking operation in the brake system 118. For instance, positioning the brake system inside the motor housing 112 allows a motor end cap to absorb heat, which may enhance heat dissipation from the braking system 118 while also blocking heat transfer to the rope 104. Reducing the amount of heat transferred to the drum may be particularly beneficial in winches utilizing ropes constructed out of synthetic material(s) which are more susceptible to thermal degradation than, for example, metal wire ropes. Additional integration advantages may further include an increased packaging efficiency (e.g., a reduced profile)

In one example, the brake system 118 comprises a ramp system comprising internal drive lugs. The ramp system may comprise ramp features configured to generate a braking pressure. It also uses internal features to distinguish between intended and unintended braking action. Any unintended torque applied to the brake will cause the brake to become engaged. Intended torque from the device motor will act to disengage brake. The ramp system allows the brake to be engaged by only the amount required to control a load during Power-Out operation, in one example.

The winch 100 further includes a control system 102 designed to operate the winch in different modalities. For example, the control system 102 may be configured to operate the winch 100 in a power-in mode where the rope 104 is wound onto the drum 106 and a power-out mode where the rope 104 is unwound from the drum 106. The direction of drum rotation occurring during the power-in mode is indicated via arrow 108 and the direction of drum rotation occurring during the power-out mode is indicated via arrow 110. However, in other configurations, the power in and out directions may be reversed. To accomplish the power-in and power-out functionality the control system 102 may include user interfaces (e.g., buttons, levers, touch screens, graphical user interfaces, peripheral devices, etc.) which may be locally and/or remotely located. The control system 102 may additionally include controllers, actuators, etc., interacting with the motor to induce rotation of the motor's output shaft in the first direction corresponding to the power-in mode and the second direction corresponding to the power-out mode. The winch can therefore be placed in a desired operation mode according to a user's predilection and/or programmatic commands.

Additionally, in certain embodiments, the control system 102 may be configured to operate the winch in a free-spool mode where the gear assembly 116 is decoupled from the drum 106. Continuing with such an example, the free-spool mode may be manually adjusted by for example, a shift lever, in some instances, or in other instances may be implemented via electronic, pneumatic, and/or hydraulic actuators.

FIG. 2 specifically shows an embodiment of a housing 200 comprising a brake system integrated therein. In one example, the housing 200 may be a non-limiting example of the motor housing 112 of FIG. 1. Additionally or alternatively, the housing 200 may be drum support housing. Furthermore, the brake system integrated into the housing 200 may be a non-limiting example of the brake system 118 of FIG. 1.

The housing 200 comprises a support 204 coupled thereto. A plurality of fasteners may physically couple the support 204 to the housing 200. In one example, the plurality of fasteners are a plurality of screws or bolts, each configured to extend through a through-hole of the support 204 and a surface of the motor housing.

The support 204 comprises an opening 210 through which an output coupler 208 is revealed. In one example, a shaft, such as a drive shaft, may extend from the output coupler 208 and through a drum of a winch to a gear housing (e.g., drive shaft 114, drum 106, winch 100, and gear housing 116 of FIG. 1).

A brake disk 206 is viewable through the opening 210. The brake disk 206 is a component of the brake system integrated into the housing 200. In the example of FIG. 2, the housing 200 is a motor housing comprising a motor 202.

Turning now to FIG. 3, showing an exploded view of a double disk brake system 300. In one example, the double disk brake system 300 is a non-limiting example of the disk brake system 118 of FIG. 1 and may be used in the motor housing 112 or the housing 200 of FIG. 2. An axis system 390 comprises three axes, namely an x-axis parallel to a horizontal direction, a y-axis parallel to a vertical direction, and a z-axis perpendicular to each of the x- and y-axes. An axis 392 is shown extending parallel to the z-axis. In one example, the axis 392 is an axis of rotation 392 about which a shaft may rotate in a clockwise direction 394 or in a counterclockwise direction 396. In one example, the clockwise direction 394 corresponds to a power-in rotational direction and the counterclockwise direction corresponds to a power-out rotational direction. Additionally or alternatively, the axis 392 may correspond to a central axis of the braking system 300.

The double disk brake system 300 may be integrated into the motor housing 200. As such, components previously introduced may be similarly numbered in this figure and subsequent figures. The motor housing 300 comprises a front end cap 306 with a plurality of features configured to mate with the motor support. The front end cap 306 features may include extensions 308 configured to interface with an interior surface 304 of the motor support 204.

A plurality of through-holes 302, 303 extend through the motor support 204 and the front end cap 306, respectively. The plurality of through-holes 302, 303 are configured to receive a plurality of fasteners that physically couple the motor support 204 to the front end cap 306.

The disk brake system 300 in FIG. 3 has a first friction disk 318 and a second friction disk 320. Extensions 322 (interchangeably referred to as tabs 322) are arranged on a perimeter of the first friction disk 318 and extensions 324 (interchangeably referred to as tabs 324) on the perimeter of the second friction disk 320 may mate with (e.g., interlock with) grooves 310 in the motor housing 200. The mating between the grooves 310 in the motor housing 200 and the extensions 322, 324 of the friction disks 318, 320 accommodate for axial translation of the friction disks 318, 320 while substantially inhibiting rotation of the friction disks 318, 320. The friction disks 318, 320 may contain protrusions 326 (e.g., pads) on a particular surface. The plurality of pads 326 are on a first surface 328 of the first friction disk 318. For the second friction disk 320, the pads 327 are on a second surface 330 of the second friction disk 320. The first surface 328 and the second surface 330 face opposite directions, wherein the first surface 328 faces the motor 202 and the second surface 330 faces away from the motor 202. As such, the first and second surfaces 328, 330 face one another. The plurality of pads may comprise a high friction material.

The double disk brake system 300 further includes a first brake disk 332 and a second brake disk 334. In one example, the second brake disk 334 is identical to brake disk 206 of FIG. 2. The first brake disk 332 and the second brake disk 334 comprise a plurality of openings 336, 337, respectively, wherein the plurality of openings 336, 337 are evenly spaced about respective central openings 338, 340. In one example, the plurality of openings 336, 337 are symmetrically arranged and evenly spaced from outer and inner circumferences of the first brake disk 332 and the second brake disk 334. Additionally or alternatively, the plurality of openings 336, 337 may be biased toward the central openings 338, 340, or toward the outer circumference or arranged asymmetrically. In one example, the plurality of openings 336, 337 are configured to dissipate heat, which may reduce warping caused by heat. It will be appreciated that the brake disks 332, 334 may rotate and translate in a cavity between the motor support 204 in a direction parallel to the axis 392.

The central openings 338, 340 of the first and second brake disks 332, 334 are herein referred to as a first central opening 338 and a second central opening 340, respectively. Each of the first central opening 338 and the second central opening 340 comprise a hexagon shape, however, other polygonal shapes may be used without departing from the scope of the present disclosure.

The first brake disk 332 and the second brake disk 334 may be identically shaped in some examples. In one example, each brake disk comprises a first portion and a second portion parallel to an x-y plane. The first portion and the second portion separated via a transition portion arranged therebetween, wherein the transition portion is angled to the x-y plane. The first portion comprises the plurality of openings 336, 337 and the second portion surrounds the central openings 338, 340.

A cam follower 342 is configured to engage with each of an input coupler 350 and the first central opening 338 of the first brake disk 332. More specifically, the input coupler 350 comprises a body 351. In one example, the input coupler 350 comprises internal features configured to have a fixed engagement with a motor shaft. The body 351 is configured to insert into an opening of the front end cap 306 at one end. The body 351 comprises two or more input protrusions 353 which may be configured to engage with inner cam follower protrusions 343 away from the first end, adjacent to a second end. In this way, rotation of the input coupler 350 may be transferred to the cam follower 342 or vice versa. In the example of FIG. 3, the inner cam follower protrusions 343 are arranged on an inner diameter of a first cam follower body 344. In one example, the first cam follower body 344 may be shaped (e.g., hexagonally shaped) identically to a shape of the first central opening 338 such that the first cam follower body 344 may be inserted into and engage with surfaces of the first central opening 338. In this way, a rotation of the first brake disk 332 is guided via the cam follower 342.

A second cam follower body 345 comprises a plurality of outer cam follower protrusions 346 which protrude in a radially outward direction. The plurality of outer cam follower protrusions 346 may be configured to engage with a plurality of stop features 361 of a plurality of ramp features 360 of the output coupler 208. In one example, the plurality of stop features 361 comprises gaps therebetween in which the plurality of cam follower protrusions 346 may be rotated into during the power-in and power-out operations. As the brake pads wear, a working position (e.g., a contact position) between the plurality of outer cam follower protrusions 346 and the plurality of stop features 361 may be adjusted. In one example, the adjusting is automatic such that the adjusting is executed without an input from a human operator. This allows the system to achieve consistent performance over the life of the brake and avoid unwanted braking delays.

The second central opening 340 may be configured to engage with an output coupler body 362, which has a hexagon shape similar to the second central opening 340. In this way, the output coupler body 362 may guide a movement of the second brake disk 334.

The output coupler 208 further comprises an opening 364 with drive features 366. The drive features 366 may accept a drive shaft. The output coupler 208 may be configured to rotationally couple to a drive shaft. Specifically, an opening 364 of the output coupler 208 engages with a drive shaft and transfers torque from the input coupler 350 in the power-in rotational direction 394 or the power-out rotational direction 396.

A spring 370 may be configured to engage with surfaces of the output coupler 208 and the cam follower 342. In one example, the spring 370 is a preload spring configured to retain the brake components in position in the brake system 300. The spring 370 may comprise a pre-load force exerted in a direction parallel to the axis 392. When the brake system 300 is assembled, the pre-load spring 370 exerts a force in opposite directions. Force from the pre-load spring 370 may preload the output coupler 208, second brake disk 334, and second friction disk 320 against an inner surface of the front end cap 306 in the direction of the winch drum (e.g., drum 106 from FIG. 1). Conversely, in the opposite direction away from the winch drum, the pre-load spring 370 may exert a force to hold the cam follower 342, first brake disk 332, and first friction disk 318 against the inner surface of the motor housing 200 further detailed in FIGS. 4A and 4B. In one example, the spring 370 is responsible for the automatic adjusting of the working position as the pads 326, 327 wear down. In the example of the present disclosure, the pads 326, 327 comprise a friction material that may reduce in size due to abrasive wear occurring during braking action.

The front end cap 306 may attach to the motor housing 202 via through-holes 307A and 307B, respectively. Bolts, screws, or other similar fasteners may extend through the through-holes 307A, 370B to physically couple the front end cap 306 to the motor 202. In this way, the front end cap 306 is independently physically coupled to each of the motor 202 and the motor support 204. When assembled, the front end cap 306 axially contains the internal parts of the double disk brake system 300 and defines a volume within the motor housing 200 in which the internal parts may be arranged, wherein the volume is arranged between the front end cap 306 and the motor support 204. Additionally, when assembled, the pads 326, 327 on the first friction disk 318 and second friction disk 320 are adjacent to the inner side 378 of the first brake disk 332 and outer side 380 of the second brake disk 334 respectively to facilitate braking actions. Positioning and grounding the brake system in the motor housing 200 will improve the brake system's ability to dissipate heat from brake activity and block unintended brake disk rotation.

In one example, the front end cap is used to close an end of the motor 202 and support a motor shaft. In some cases, an extension 203 of the motor housing may be positioned between the motor shaft and the front end cap to support the motor shaft. In some examples, the front end cap 306 comprises the motor extension 301 integrated therein, such as illustrated in the example of FIG. 3. The front end cap 306 is configured to receive trust loads from brake components while piloting the input coupler 350. More specifically, the front end cap 306 comprises a shaft support bearing configured to pilot the input coupler to align the brake members concentrically, relative to the axis 392. The shaft support bearing may support a thrust load from a motor armature and a winch clutch spring. In the example of the present disclosure, the bearing is a ball bearing, however, the bearing may be a needle roller bearing or a thrust bearing without departing from the scope of the present disclosure.

Turning now to FIG. 4A, a side-on view 400 of the assembled perspective view of the motor housing 200 comprising the double disk brake system 300 is illustrated. FIG. 4B illustrated a cross-section 450 taken along a plane parallel to the axis 392. FIGS. 4A and 4B are described in tandem herein. As illustrated, only the input coupler 350 may be in direct, face-sharing contact with a motor shaft 452.

The first cam follower body 344 of the cam follower 342 is in face-sharing contact with central opening 338 of the first brake disk 332. In one example, the first brake disk 332 rotates with the cam follower 342.

The output coupler body 362 of the output coupler 208 is in face-sharing contact with the central opening 340 of the second brake disk 334. In one example, the second brake disk 334 rotates with the output coupler 208.

The second brake disk 334 is adjacent to the second friction disk 320 which is adjacent to the motor support 204. More specifically, the second brake disk 334 is in face sharing contact with the pads 327 on the second surface 330 of the second friction disk 320. The first brake disk 332 is arranged adjacent to the first friction disk 318, distal to the motor support 204. More specifically, the first brake disk 332 is in face-sharing contact with pads 326 on the first surface 328 of the first friction disk 318.

As illustrated in the example of FIG. 4B, the first brake disk 332 and the second brake disk 334 comprise first and second portions arranged in different planes. The first and second portions are separated via an angled transition portion arranged therebetween. In one example, the first brake disk 332 and the second brake disk 334 comprise a z-shaped cross-section.

The spring 370 is arranged in a space around the input coupler 350, inside output coupler 208, and the cam follower 342. In one example, the spring 370 applies a pressure such that as the pads 326 degrade over time due to friction, the spring 370 may occupy more space.

The components of the double disk brake assembly 300 are arranged in a space arranged between the front end cap 306 and the motor support 204, wherein a diameter of the gap is substantially uniform. That is to say, the first friction disk 318, the second friction disk 320, the first brake disk 332, the second brake disk 334, the output coupler 208, the spring 370, the cam follower 342, and the body 351 of the input coupler 350 are each arranged radially interior of the space.

In one example, the double disk brake assembly 300 of FIGS. 3, 4A and 4B comprises an input coupler 350 positioned within the motor housing 200 with a first end inserted into an opening of a first brake pad 332. The input coupler 350 is arranged on a central axis (e.g., axis 392) of the motor housing 200 adjacent to the motor 200 and comprises an end surface to transfer a thrust load to the motor output shaft 452.

The input coupler 350 comprises a plurality of splines in radial and sliding contact with features on radially interior surfaces of a cam follower 342 and an output coupler 208. In one example, a hexagon or spline shaped surface is arranged on an interior of the input coupler 350 to receive input torque from a drive or motor shaft.

The first friction disk 318 is positioned radially interior to the front end cap 306 so that a motor facing surface of the first friction disk 318 is positioned against an interior surface of the front end cap 306, which may inhibit rotation of the first friction disk 318.

The first friction disk 332 is positioned radially interior to the front end cap 306 proximally to the first friction disk 318. In one example, the first friction disk 332 is in face sharing contact with the friction pads of the first friction disk 318. The cam follower 342 is positioned around the input coupler 350 and is configured to receive torque from the input coupler 350 via the interaction between the coupler splines and inner diameter follower protrusions. The cam follower 342 further comprises outer diameter protrusions on an outer diameter in contact with ramps of the output coupler 208. The outer diameter protrusions may be configured to transfer brake pressure to a brake disk which is rotatably fixed to the cam follower via a hexagon shaped feature of the first cam follower body 344. Thus, the cam follower 342 is configured to transfer a brake pressure to the first brake disk 332.

The pre-load spring 370 is arranged interior to the cam follower 342 and configured to take-up clearance in the brake system 300 as the brake pads wear. The output coupler 208 is in sliding contact with the cam follower 342. A first side of the output coupler 208 comprises a plurality of ramp surfaces. In one example, a number of the ramp surfaces is equal to a number of the exterior protrusions of the cam follower. The ramp surfaces may generate an axial force in response to an unintended torque being applied to the brake system. Stop features at extreme ends of the ramp surface are configured to limit the range of brake component travel. In one example, additionally or alternatively, the preload spring 370 produces an axial load which may push the cam follower 342 and the output coupler 208 toward the friction disks 318, 320.

The output coupler 208 further comprises a counterbore in which a plurality of interior protrusions is arranged and configured to engage radially and slidingly with the splines of the input coupler. The output coupler 208 may further comprise a gear spline feature on an inside diameter to transfer torque from the brake to the drive shaft. The output coupler 208 further comprises a hexagon feature in rotatable coupling with a brake disk.

The brake system 300 comprises two brake disks. The brake disks may comprise steel or another suitable material. In one example, the brake disks comprise heat treated steel. The first brake disk 332 is rotatably coupled to the cam follower and the second brake disk 334 is rotatably coupled to the output coupler 208. Each brake disk may be in sliding contact with a friction disk. Each of the friction disks comprise features configured to dissipate heat during a braking action. In one example, the double brake disk configuration may be preferred to a single disk brake configuration due to an increased braking force. The present disclosure provides an example of a brake system comprising a double disk brake configuration and integrally arranged into the motor housing, while comprising other features that enhance the braking performance of the brake system.

The friction disks are positioned within the motor housing such that a side of one of the first friction disk in contact with the first disk brake is positioned against an interior surface of the front end cap. The friction disks may comprise features on their perimeter that may engage and/or mate with features on an inside of the front end cap that block rotation of the friction disks. The friction disks may comprise a friction material bonded to a surface facing the brake disks. The friction material may comprise a relatively high coefficient of friction and are configured to provide a desired brake capacity. The friction disks are prone to wear and configured to be replaced as needed.

The second friction disk may further be in face-sharing contact with a front end cap. The front end cap is positioned within the motor housing and is configured as a barrier for the brake assembly. The front end cap may be physically coupled to the motor housing via a plurality of fasteners, wherein the fasteners may compress the preload spring and generate a minimal brake pressure.

In one example, the motor support 204, or a drum support in some examples, is used to complete the brake assembly. Coupling the front end cap 306 to the motor support 204 compresses the preload spring 370 configured to hold the brake components in position. The front end cap 306 may at least be partially position within the motor support 204 when the double disk brake system 300 is fully assembled. The motor support 204 may be configured to block external debris and function as a heat sink to absorb heat away from the double disk brake system components.

Turning now to FIGS. 5A and 5B, they show a perspective view 500 and a side-on view 550 of the assembled double brake assembly 400 without the motor housing 200. More specifically, FIG. 5B illustrates a space 552 between the brake disks, the output coupler 208, and the cam follower 342. The side-on view 550 further illustrates the plurality of cam follower protrusions 346 engaging with the plurality of stop features 361 of the output coupler 208. The plurality of cam follower protrusions 346 and the plurality of stop features 361 are illustrated in greater detail with respect to FIGS. 8 to 9C.

FIG. 6 illustrates an exploded view 600 of the output coupler 208, input coupler 350, and cam follower 342. As illustrated, the output coupler 208 further comprises a plurality of torque lugs 602 arranged on an output coupler inner body 604. As illustrated, the output coupler inner body 604 comprises a smaller inner diameter and outer diameter than the output coupler body 362. The input coupler protrusions 353 may be engaged with the inner cam follower protrusions 343 and the torque lugs 602 of the output coupler 208 via their elongated shape. During operation, the input coupler 350 may rotate in the power-out rotational direction, resulting in the cam follower 342 and the output coupler 208 rotating therewith.

FIG. 7 illustrates a vantage point 700 of the output coupler 208, the input coupler 350, and the cam follower 342 in an assembled condition. In one example, the vantage point 700 is taken in a direction toward the motor housing and away from the winch. As shown, the input coupler protrusions 353, inner cam follower protrusions 343, and torque lugs 602 are configured to promote substantially synchronous movement of the input coupler 350, the cam follower 342, and the output coupler 208. In one example, torque input in the first direction and the second direction may bias the inner cam follower protrusions 343 and the torque lugs 602 into an axial aligned position.

Turning to FIG. 8A, it shows an embodiment 800 of the output coupler 208. The plurality of stop features 361 are illustrated in greater detail. As shown, the plurality of stop features 361 are arranged on an outer circumference of the output coupler 208. In the present example, there are exactly three stop features, however, other embodiments may comprise greater or less than three stop features without departing from the scope of the present disclosure. The plurality of stop features 361 are separated by the plurality of ramp features 360 of a ramp system. In one example, a first side of a ramp feature may limit travel of a cam follower in a first direction and apply a clamping force to the preload spring. A second side of the ramp feature may limit travel of the cam follower in a second direction opposite the first direction. In one example, the cam follower may contact the second side of the stop feature at the end of brake life. The second side may further limit axial movement of the brake components.

Each stop feature of the plurality of stop features comprises a first section 802 a second section 812, and a third section 822. It will be appreciated that the output coupler 208 is a single piece and that the stop feature is described in sections merely for reasons of clarity. The first section 802 comprises a relatively flat surface wherein surfaces of the first section 802 are either normal or parallel to the axis 392.

The second section 812 extends from the first section 802 toward the third section 822. The second section 812 comprises a ramp surface 814 comprising an angle 816 relative to the axis 392. The angle 816 may be greater than 0 and less than 90 degrees. In some examples, the angle 816 is between 50 and 80 degrees. In one example, the angle 816 is between 65 and 80 degrees. Additionally or alternatively, the angle 816 is between 70 and 75.

The third section 822 comprises a first surface 824 continuous with the ramp surface 814. The first surface 824 is parallel to the axis 392 and may function as an end of brake life stop. As such, the first surface 824 may be shaped as a stop feature, configured to stop rotation advancement of a working position. The working position is described in greater detail below with respect to FIGS. 9A to 9C.

The third section 822 further comprises a second surface 826, normal to the first surface 824, wherein an angled surface 828 extends at an angle 829 relative to the axis 392. The angle 829 may be between 10 and 60 degrees. In one example, the angle 829 is between 30 to 40 degrees. The angle 829 of the angled surface 828 and the angle 816 of the ramp surface 814 may be configured to apply a compressive load on the spring, such as spring 370 of FIG. 3. In one example, an intersection between the second surface 826 and the angled surface 828 shapes a stop feature of the plurality of stop features 361.

In this way, each stop feature of the plurality of stop features 361 comprises a plurality of angled surfaces arranged on opposite sides of the stop feature. In one example, the ramp surface is a first angled surface on a first side of the stop feature and the angled surface 828 is a second angled surface on a second side of the stop feature opposite the first side.

Turning now to FIG. 8B, it shows an embodiment 850 of the cam follower 342. The cam follower 342 comprises the plurality of cam follower protrusions 346, a number of which is equal to a number of the plurality of ramp features 360 of FIG. 8A. In one example, there are exactly three of the plurality of cam follower protrusions 346 and plurality of stop features 361.

Each cam follower protrusion of the plurality of cam follower protrusions comprises a spring ramp having a first clamp surface 852 arranged on a first side and a second clamp surface 862 arranged on a second side, opposite the first side. The first clamp surface 852 comprises a first angle 854 relative to the axis 392 and the second clamp surface 862 comprises a second angle 864 relative to the axis 392.

The first angle 854 is less than the second angle 864. In one example, the first angle 854 is between 5 and 25 degrees. Additionally or alternatively, the first angle 854 is between 10 and 25 degrees. The second angle 864 may be between 30 and 75 degrees. In one example, the second angle 864 is between 35 and 65 degrees. The first clamp surface 852 and the second clamp surface 862 may be configured to engage with the angled surface 828 of the third section 822 of the plurality of stop features 361 during a braking event during a power in/out cycle 902 as shown in FIG. 9A. This engagement may result in a compressive force applied to the preload spring, such as spring 370 of FIG. 3.

Each cam follower protrusion further comprises a brake pressure ramp comprising a first surface 872 and a second surface 874. The first surface 872 is normal to the axis 392 and may be configured to engage with the first section 802 of the output coupler 208 of FIG. 8A. As illustrated in FIG. 9B, a first working position 902 illustrates the first surface 872 in face-sharing contact with the first section 802. In one example, the first working position 902 corresponds to a beginning of life working position wherein pads of the frictions disks are not degraded (e.g., worn).

The second surface 874 is angled to the axis 392. In one example, the angle of the second surface is identical to the angle 816 of the ramp surface 814 of the second section 812 of the output coupler 208. In this way, the second surface 874 may engage with the ramp surface 814 of the second section 812 of the plurality of stop features 361 of the output coupler. As shown in FIG. 9C, the second surface 874 may move along an entire length of the ramp surface 814, wherein a third surface 882 contacts and engages with the first surface 824 of the third section 822. In one example, a second working position 904 illustrated in FIG. 9C is an end of life working position, thereby indicating a desire to replace the friction disks due to a wearing beyond a threshold such that braking performance is reduced.

Between the first working position 902 and the second working position 904, the second surface 874 may contact different portions of the ramp surface 814 based on a degradation of the friction pads. For example, as the pads are more degraded (e.g., worn), the second surface 874 may contact portions of the ramp surface 814 closer to the third section 822. Furthermore, the spring 370 may be elongated as the second surface 874 moves along the ramp surface 814 toward the third section 822. As the pads are less degraded (e.g., newer), the second surface 874 may contact portions of the ramp surface 814 closer to the first section 802. Unintended torque applied to the output coupler 208 may result in the plurality of outer cam follower protrusions sliding up the ramp surface 814 toward the first surface 824 (e.g., an end stop). This action may create a force on the first and second brake disks 320, 322. That force may be transferred to friction pads, resulting in a braking action. However, outside of a braking configuration, the working position may be entered, which may resemble one of the positions of FIG. 9B, FIG. 9C, or a position therebetween. Input torque from the motor in either direction may force the cam follower 342 and the output coupler 208 into the orientation illustrated in FIG. 9A. This position may compress the pre-load spring 370.

That is to say, FIG. 9B illustrates a first working position 902 for new, unworn pads. The pads in the first working position 902 may comprise their original thickness, measured along the axis of rotation, and force the cam follower 342 along the second section 812 to a region adjacent the first section 802. FIG. 9C illustrates a working position 904 for worn pads. In one example, the working position 904 corresponds to a request for the pads to be replaced. Unintended torque force the cam follower 342 along the second section 812 to a region adjacent the third section 822. In all working positions between positions 900 and 904, the cam follower 342 is automatically adjusted without human inputs or the like. During a braking event, the working position will change from 900 to any position between the first working position 902 and the second working position 904 depending on a condition of the brake.

In one example, the working position of the brake components depends on a condition of the brake pads and a torque being provided to the brake. The brake disks may become increasingly separated as a brake material (e.g., friction pad thickness) is reduced. Additionally or alternatively, unintended torque from the gear assembly, which may be generated via force on a rope of a winch, forces the output coupler into a position that applies a pressure to the cam follower. The pressure may correspond to a brake action. Additionally or alternatively, input torque from the motor via the drive shaft may bias the output coupler to a position where little to zero pressure is applied to the cam follower. As such, pressure is removed from the brake disks to allow torque transfer to the shaft.

FIGS. 1-9C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to other winch types. The subject matter of the present disclosure includes all novel and non-obvious combinations and sub-combinations of the various systems and configurations, and other features, functions, and/or properties disclosure herein.

As used herein, the terms "approximately" and "substantially" are construed to mean plus or minus five percent of the range unless otherwise specified.

The invention claimed is:

1. A winch system, comprising:
   a brake system comprising a disk brake in face-sharing contact with a friction disk, an input coupler, a cam follower, and an output coupler;
   wherein a working position along a ramp surface between two stop features and a surface of a cam follower protrusion is adjusted based on pads of the friction disk, wherein the input coupler, the cam follower, and the output coupler rotate based on an engagement between the disk brake and the friction disk, wherein the brake system is arranged in a motor housing; and
   a spring arranged in a space between the input coupler, the cam follower, and the output coupler, wherein an expansion of the spring adjusts the working position of the brake system.

2. The winch system of claim 1, wherein the input coupler comprises a plurality of input protrusions that extend along an entire length of a body of the input coupler.

3. The winch system of claim 2, wherein the plurality of input protrusions is in engagement with a plurality of inner cam follower protrusions of the cam follower and a plurality of torque lugs of the output coupler.

4. The winch system of claim 1, wherein the ramp surface is angled relative to an axis of rotation of a drive shaft that extends from the brake system.

5. The winch system of claim 4, wherein a stop feature of the two stop features comprises a first section, a second section, and a third section, wherein the first section comprises surfaces normal and parallel to the axis of rotation, and wherein the second section comprises the ramp surface, and wherein the third section comprises a first surface in contact with the ramp surface and parallel to the axis of rotation, a second surface normal to and in contact with the first surface, and a third surface adjacent to the ramp surface, wherein the third surface is angled relative to the axis of rotation.

6. The winch system of claim 5, wherein an angle of the ramp surface is greater than an angle of the third surface.

7. The system of claim 5, wherein the surface of the cam follower protrusion is angled identically to the ramp surface.

8. The system of claim 5, wherein the cam follower protrusion further comprises a spring ramp surface configured to engage with the third surface of the third section of the output coupler.

9. A braking system, comprising
   a shaft;
   a first friction disk and a second friction disk comprising a plurality of friction pads in face-sharing contact with a first brake disk and a second brake disk;
   an input coupler comprising a body, wherein a plurality of input protrusions is arranged on the body, wherein the input coupler is engaged with the shaft;
   a cam follower comprising a plurality of inner cam follower protrusions configured to engage with the plurality of input protrusions, where the cam follower further comprises a plurality of outer cam follower protrusions;
   an output coupler comprising a plurality of torque lugs configured to engage with the plurality of input protrusions, where the output coupler further comprises a plurality of stop features configured to engage with the plurality of outer cam follower protrusions, wherein a working position between the plurality of stop features and the plurality of outer cam follower protrusions is adjusted along an angled surface of the plurality of stop features as the plurality of friction pads degrade; and
   a motor housing in which the braking system is integrally arranged.

10. The braking system of claim 9, wherein the braking system is arranged between a front end cap and a motor support of the motor housing.

11. The braking system of claim 9, wherein the braking system and the motor housing are incorporated in a winch system or a hoist system.

12. The braking system of claim 9, wherein the plurality of outer cam follower protrusions comprises a spring ramp portion and a brake pressure ramp portion, wherein the brake pressure ramp portion is in face-sharing contact with the angled surface in the working position, and wherein the spring ramp portion is in face-sharing contact with a pointed stop feature of the plurality of stop features during a power-in or a power-out condition.

13. The braking system of claim 12, wherein the angled surface is a first angled surface, wherein the pointed stop feature comprises a second angled surface facing the first angled surface.

14. The braking system of claim 13, wherein the first angled surface and the second angled surface are angled relative to a central axis of the braking system, and wherein the central axis corresponds to an axis of rotation of the shaft of the braking system.

15. The braking system of claim 14, wherein an angle of the first angled surface is greater than an angle of the second angled surface.

16. A braking system for a winch or a hoist, comprising:
   a motor housing comprising a double disk brake braking system integrated therein, wherein the double disk brake braking system is engaged with a motor output shaft of a motor of the motor housing;
   an input coupler, a cam follower, and an output coupler arranged between a first disk brake and a second disk brake of the double disk brake braking system; and
   a spring arranged in a space between the input coupler, the cam follower, and the output coupler, wherein an expansion of the spring adjusts a working position of the double disk brake braking system;
   wherein the working position between angled surfaces of the output coupler and the cam follower is automatically adjusted via a spring arranged in a space between the input coupler, the cam follower, and the output coupler, the automatic adjustment in response to a wear of a plurality of pads of a first friction disk and a second friction disk, and wherein the input coupler, the cam follower, and the output coupler rotate based on an engagement between the disk brake and the friction disk.

17. The braking system of claim 16, wherein a spring is configured to expand as the wear of the plurality of pads increases.

18. The braking system of claim 17, wherein the spring is fully expanded in response the wear of the plurality of pads being beyond a threshold.

* * * * *